US010081329B2

(12) United States Patent
Englbrecht et al.

(10) Patent No.: US 10,081,329 B2
(45) Date of Patent: Sep. 25, 2018

(54) PYROTECHNICAL ACTUATOR FOR VEHICLE SAFETY SYSTEM, ACTUATOR ASSEMBLY, VEHICLE SAFETY SYSTEM COMPRISING SUCH ACTUATOR AS WELL AS ACTUATING METHOD

(71) Applicant: TRW Airbag Systems GmbH, Aschau am Inn (DE)

(72) Inventors: Karl Englbrecht, Erharting (DE); Vadim Kolbin, Haar (DE); Hans-Peter Neumayer, Ampfing (DE); Georg Tautschnig, Vilsbiburg (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 15/372,542

(22) Filed: Dec. 8, 2016

(65) Prior Publication Data
US 2017/0166161 A1 Jun. 15, 2017

(30) Foreign Application Priority Data

Dec. 15, 2015 (DE) .................... 10 2015 016 193

(51) Int. Cl.
*B60R 21/26* (2011.01)
*B60R 21/264* (2006.01)
*B60R 21/38* (2011.01)
*B60R 21/276* (2006.01)
*F15B 15/19* (2006.01)

(52) U.S. Cl.
CPC ........ *B60R 21/2644* (2013.01); *B60R 21/276* (2013.01); *B60R 21/38* (2013.01); *F15B 15/19* (2013.01)

(58) Field of Classification Search
CPC ... B60R 21/2644; B60R 21/38; B60R 21/276; F15B 15/19
See application file for complete search history.

(56) References Cited

U.S. PATENT DOCUMENTS

| 3,354,634 | A | | 11/1967 | McGirr | |
|---|---|---|---|---|---|
| 4,669,354 | A | * | 6/1987 | Lucy | F42B 3/006 60/634 |
| 7,735,405 | B2 | * | 6/2010 | Parks | B60R 21/34 89/1.14 |
| 2003/0029307 | A1 | * | 2/2003 | Daoud | F15B 15/063 89/1.14 |
| 2012/0125219 | A1 | * | 5/2012 | Mayville | B60R 21/2644 102/530 |

(Continued)

*Primary Examiner* — Drew J Brown
(74) *Attorney, Agent, or Firm* — Tarolli, Sundheim, Covell & Tummino LLP

(57) ABSTRACT

The invention relates to a pyrotechnical actuator for a vehicle safety system comprising a cylinder (10) and a hollow piston (20) being displaceable relative to each other from an idle state to an activated state, wherein an igniter unit (30) being tightly connected to the hollow piston (20) is arranged inside the hollow piston (20). The invention excels by the fact that in the idle state the hollow piston (20) is received in the cylinder (10) and in the activated state it protrudes at least partially from the cylinder (10) so that the actuator has a larger total length in the activated state than in the idle state. The invention further relates to an actuator and a vehicle safety system comprising such actuator as well as to an actuating method.

14 Claims, 2 Drawing Sheets

(56) References Cited

U.S. PATENT DOCUMENTS

| | | | |
|---|---|---|---|
| 2015/0090111 A1* | 4/2015 | Henck | B60R 21/38 92/14 |
| 2015/0175496 A1* | 6/2015 | Inuzuka | B60R 21/38 102/530 |
| 2015/0183693 A1* | 7/2015 | Aoyama | C06D 5/00 102/530 |
| 2015/0226239 A1* | 8/2015 | Wilmot | B60R 21/38 91/5 |
| 2016/0001736 A1* | 1/2016 | Van Hooser | B60R 21/38 89/1.14 |
| 2018/0058481 A1* | 3/2018 | Wilmot | F15B 15/19 |

* cited by examiner

Fig. 2

PYROTECHNICAL ACTUATOR FOR VEHICLE SAFETY SYSTEM, ACTUATOR ASSEMBLY, VEHICLE SAFETY SYSTEM COMPRISING SUCH ACTUATOR AS WELL AS ACTUATING METHOD

BACKGROUND OF THE INVENTION

The invention relates to a pyrotechnical actuator for a vehicle safety system in accordance with the preamble of claim 1. The invention further relates to an actuator assembly, a vehicle safety system as well as a method of actuating an actuator. A pyrotechnical actuator in accordance with the afore-mentioned type is known, for example, from U.S. Pat. No. 3,354,634 A1.

The known actuator comprises a cylinder and a hollow piston, the hollow piston and the cylinder being movable relative to each other. The hollow piston includes a distal slotted end portion which in the idle state of the actuator projects in a longitudinally axial direction from one axial end of the cylinder. For this purpose, at the axial end of the cylinder a land guided within the slotted end portion of the hollow piston is provided. Inside the hollow piston an igniter is arranged. The igniter is connected to the hollow piston and contains propellant charge which after ignition releases propellant gas. The released propellant gas causes an increase in pressure inside the hollow piston, thus causing the hollow piston to be displaced in the longitudinally axial direction inside the cylinder. Especially the hollow piston is displaced into the cylinder so that the total length of the actuator is reduced after activation. In other words, the overall length of the known actuator is larger in the idle state than in the activated state.

The relatively large overall length in the idle state is a problem in view of mounting of the actuator into an automotive vehicle. There is a trend towards ever more compact vehicles including increasingly complex technical equipment. The construction space available in a modern vehicle is limited in this respect. Consequently, there is a basic need for compact subassemblies for being mounted in a vehicle.

SUMMARY OF THE INVENTION

It is the object of the invention to state a pyrotechnical actuator having a small overall length especially in the idle state. It is another object of the invention to state an actuator assembly and a vehicle safety system comprising such actuator. It is a further object of the invention to state an actuating method for an afore-mentioned actuator.

In accordance with the invention, this object is achieved with respect to the actuator by the subject matter of claim 1, with respect to the actuator assembly by the subject matter of claim 8, with respect to the vehicle safety system by the subject matter of claim 9 and with respect to the actuating method by the subject matter of claim 10.

The invention is based on the idea to provide a pyrotechnical actuator for a vehicle safety system comprising a cylinder and a hollow piston which are movable relative to each other from an idle state to an activated state. Within the hollow piston an igniter unit being tightly connected to the hollow piston is arranged. In the idle state the hollow piston may be accommodated in the cylinder. In the activated state the hollow piston may protrude at least partially from the cylinder so that in the activated state the actuator has a larger total length than in the idle state.

It is the advantage of the invention that by integrating the igniter into the hollow piston, on the one hand, and by reversing the displacing movement, on the other hand, the overall length of the actuator in the idle state, i.e. in the usual mounting position inside a vehicle before the actuator is activated or, resp., triggered, is considerably reduced. Upon or after activation of the actuator, as requested the latter then may have a larger total length than in its idle state so as to move another component in the vehicle such as a hood and, resp., lift the latter by a certain distance, as intended. At the same time, the use of a hollow piston entails considerable saving of material which also results in a reduction of the mass and, resp., the weight of the actuator. Moreover, the actuator according to the invention excels by simple design resulting in time and cost savings during production.

In a preferred embodiment of the actuator according to the invention, in the idle state the hollow piston is accommodated substantially completely in the cylinder and the igniter unit, especially an igniter base of the igniter unit, is tightly and especially positively connected to a proximal longitudinal end of the hollow piston. The igniter base may protrude at least in portions from the hollow piston. In particular, the igniter base may partly project from the cylinder. When the igniter unit is activated, the igniter base absorbs high forces. The connection of the igniter unit to the hollow piston enables said forces to be appropriately transferred. A positive connection is of special advantage so as to transfer the forces acting on the igniter unit to the hollow piston.

The igniter unit may be positioned, in the idle state of the actuator, inside a proximal axial opening of the cylinder. In particular along with the arrangement of the igniter unit at the proximal longitudinal end of the hollow piston the compact design of the actuator is improved in this way with respect to the overall length in the idle state. When in the idle state the piston is accommodated substantially completely inside the piston, the small overall length will be especially evident.

The igniter unit, in particular the igniter base, may form or have an actuating element for functional elements of the vehicle safety system to be activated. Especially, in the activated state the igniter unit may directly or indirectly impinge on or abut against a component of a vehicle to be actuated such as a hood so as to lift or move the component (the hood) over a certain distance. Moreover, the igniter unit may be used to release and/or sever tethers, to operate opening mechanisms or to mechanically separate electric connections. In any case the igniter unit may include in the direction of motion of the hollow piston an actuating element in that it forms the tip of the latter which is used for predetermined activation of a function of the vehicle safety system.

In a preferred embodiment of the actuator according to the invention, the hollow piston has a length corresponding substantially to the length of the cylinder. This ensures the hollow piston to be received or, resp., immersed substantially completely in the cylinder in the idle state. The total length of the actuator in this way is largely defined by the length of the cylinder.

The hollow piston may have a distal longitudinal end including a gas outlet opening. The gas outlet opening may be arranged especially in the longitudinally axial direction vis-à-vis the igniter unit. Upon activation of the igniter unit propellant gas is generated which exits the hollow piston through the gas outlet opening at the distal longitudinal end. The increase in pressure inside the actuator so far occurs mainly at the distal longitudinal end of the hollow piston. As a result, the hollow piston is slid out of the cylinder in the proximal direction or the cylinder is displaced in the distal direction vis-à-vis the stationary hollow piston.

In order to bring about relative movement between the hollow piston and the cylinder due to pressure increase inside the actuator, the cylinder preferably includes a distal end cover. The distal end cover may completely close the cylinder especially in the idle state and in the activated state.

Preferably the gas outlet opening of the hollow piston is adjacent to the distal end cover of the cylinder or is in direct vicinity thereof, resp., in the idle state of the actuator. The propellant gas exiting the gas outlet opening thus acts directly on the end cover and initiates the relative movement between the cylinder and the hollow piston.

The distal end cover of the cylinder may be more distant from the distal longitudinal end of the hollow piston in the activated state of the actuator than in the idle state of the actuator. In other words, the relative movement between the cylinder and the hollow piston is configured so that the hollow piston and the cylinder will substantially move apart from each other and thus the total length of the actuator will increase.

A preferred embodiment of the actuator according to the invention provides the hollow piston to include a piston closure element guiding the hollow piston inside the cylinder and/or forming a limit slop for the hollow piston in the activated state. The gas outlet opening at the distal longitudinal end of the hollow piston preferably is formed in the piston closure element. The piston closure element may be configured so as to radially protrude from the lateral surface of the hollow piston and in this way to permit coaxial guiding of the hollow piston inside the cylinder. The piston closure element may especially have a cross-sectional diameter that substantially corresponds to the inner diameter of the cylinder with clearance fit.

At its proximal end the cylinder may be tapered so that the piston closure element abuts against the tapering in the activated state. In this respect, the piston closure element in the activated state forms an end stop for the hollow piston. In particular, in this case the piston closure element prevents the hollow piston from being completely slid out of the cylinder and, resp., prevents the hollow piston and the cylinder from being completely separated from each other.

In the actuator according to the invention the igniter unit preferably includes a propellant cap confining a combustion chamber for propellant, especially propellant pellets and/or propellant rings and/or propellant granules. Preferably the propellant cap has one or more radial-side and/or end-side through holes that are dimensioned so that, on the one hand, the propellant may be retained inside the propellant cap, i.e. in the combustion chamber, and, on the other hand, propellant gas generated by the propellant may escape from the propellant cap. The through holes may additionally be closed by means of a cover film or tamping, for example in the form of a thin metallic film, which can be destroyed in the activated state. As an alternative, the propellant cap need not include any such radial-side and/or end-side through holes and may be opened in the activated state by bursting open or being torn especially on its end face. The propellant cap may have a thin metal casing, for example made of aluminum, or else may be made from plastic material. The igniter unit thus forms a compact pyrotechnical component which can be easily integrated in the hollow piston during the manufacturing process.

In order to prevent propellant particles contained in the propellant gas flow from entering the cylinder after activation of the igniter unit, a filter for propellant particles may advantageously be arranged in the hollow piston. The filter is permeable to propellant gas but withholds propellant particles so that almost exclusively propellant gas flows into the cylinder. In addition, the filter prevents a vent hole arranged in the wall of the hollow piston from clogging and blocking by holding propellant particles and, resp., propellant slag off the vent hole after activation of the igniter unit.

Manufacture of the actuator according to the invention may be facilitated by combining the igniter unit and the hollow piston into a uniform assembly. It may especially be provided for the hollow piston to form a unit with the igniter unit which is held together by a joint surrounding by plastic injection-molding. The hollow piston may additionally comprise the piston closure element and/or the filter for propellant particles. In this way, jointly with the igniter unit the hollow piston forms a piston assembly which is adapted to be handled as a unit and to be displaced as a uniform assembly in the activated state.

One independent aspect of the invention relates to an actuator assembly, especially a hood lifting device for a vehicle comprising an afore-described actuator. The actuator assembly according to the invention may be provided to have a stationary cylinder so that the hollow piston is displaceable relative to the cylinder when it changes from the idle state to the activated state. Alternatively, an actuator assembly may be designed to have an afore-described actuator according to the invention in a manner according to the invention in which the hollow piston is fixed to be stationary, especially indirectly by the igniter base, so that the cylinder is displaceable relative to the hollow piston when it changes from the idle state to the activated state.

The actuator itself in both variants has a preferably identical design. The two alternatives differ by the connection of the actuator to surrounding components of the actuator assembly, however. When the cylinder is fixed to be stationary, for example to a body part of a vehicle, the hollow piston is slid out of the cylinder by activation of the actuator. In this case the actuating element for functional elements of the vehicle safety system to be activated is preferably constituted by the igniter base of the igniter unit. When, on the other hand, the hollow piston is stationary fixed to further components of the actuator assembly, the cylinder, especially the distal end cover of the cylinder, may serve as an actuating element, as the cylinder is movable by activation of the actuator.

The actuator according to the invention is especially suited for use as a hood lifting device for a vehicle. The actuator in the activated state acts on a hood and/or a hinge mechanism of a hood of an automotive vehicle. Upon activation of the actuator the hood thus is adapted to be lifted from its original home position and thus the distance between the deformable hood and hard engine parts located there beneath is increased. This serves for pedestrian protection. In the case of crash, the energy-absorbing deformation of the hood is thus prevented from being limited or, resp., excessively limited by the hard engine components located there beneath. This helps to reduce the risk of injury for pedestrians.

Another independent aspect of the invention relates to a vehicle safety system, especially an airbag system, comprising an afore-described actuator according to the invention or an afore-described actuator assembly according to the invention.

In addition, within the scope of the present invention a method of actuating an afore-explained actuator is provided, wherein upon triggering the igniter inside the hollow piston gas pressure is built up which acts against a distal end cover of the cylinder so that the hollow piston and the cylinder are moved relative to each other, with especially the igniter moving away from the distal end cover of the cylinder.

BRIEF DESCRIPTION OF THE DRAWINGS

Hereinafter the invention snail be illustrated in detail by way of two preferred embodiments, wherein FIG. 2 shows a longitudinal sectional view across an actuator according to the invention in accordance with another preferred embodiment.

DESCRIPTION

Figure 1:
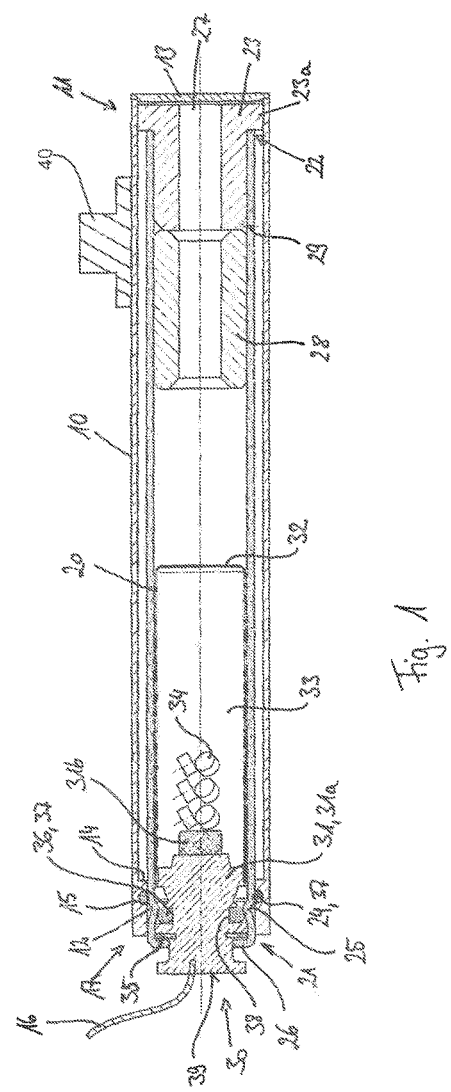
FIG. 1 shows a longitudinal sectional view across an actuator according to the invention in accordance with a preferred embodiment.

FIG. 1 illustrates a first embodiment of an actuator according to the invention in a longitudinal sectional view. The actuator includes a cylinder 10 and a hollow piston 20. The hollow piston 20 is guided to be sliding and movable inside the cylinder 10. Concretely speaking, each of the cylinder 10 and the hollow piston 20 has a circular-cylindrical basic shape, with an outer diameter of the hollow piston 20 being smaller than an inner diameter of the cylinder 10.

The cylinder 10 comprises a distal end 11 provided with an end cover 13. The end cover 13 completely closes the distal end 11 of the cylinder 10. Especially the end cover 13 may be welded to the circular-cylindrical base of the cylinder. The cylinder 10 includes a proximal axial opening 12 at a proximal end 17. The proximal axial opening 12 is dimensioned so that the hollow piston 20 may be slid through the proximal axial opening 12 of the cylinder 10. Hence the diameter of the proximal axial opening 12 is at least as large as the outer diameter of the hollow piston 20. Moreover, at the proximal end 17 of the cylinder 10 a tapering 14 is provided. In particular, in the embodiment according to FIG. 1 the cylinder 10 has a larger wall thickness at the proximal end 17 than in the residual area of the cylinder 10. In the area having an increased wall thickness an inner annular groove 15 receiving a seal ring 24 is formed. The seal ring 24 is an O-ring 37 and seals the cylinder 10 against the hollow piston 20.

The hollow piston 20 includes a proximal longitudinal end 21 and a distal longitudinal end 22. In the area of the distal longitudinal end 22 the hollow piston 20 is closed by a piston closure element 23, with the piston closure element 23 comprising a gas outlet opening 27. The gas outlet opening 27 is aligned coaxially with respect to the hollow piston 20.

The piston closure element 23 includes a radial flange 23a protruding radially from the outer periphery of the hollow piston 20 and being supported to be sliding on an inner peripheral surface of the cylinder 10. The radial flange 23a so far constitutes a guide means for guiding the hollow piston 20 inside the cylinder 10. At the same time the radial flange 23a forms a limit stop for the hollow piston 20. In the activated state of the actuator the radial flange 23a is adjacent to the tapering 14 and in this way prevents the hollow piston 20 from being completely slid out of the cylinder 10.

A filter 28 is connected to the piston closure element 23 in the proximal direction inside the hollow piston 20. The filter 28 serves for filtering and, resp., receiving propellant particles and, resp., propellant slag in the activated state. In this respect, the filter 28 may ensure that substantially exclusively propellant gas flows out of the gas outlet opening 27. Between the filter 28 and the piston closure element 23 a lateral vent hole 29 is provided in the wall of the hollow piston 20. The lateral vent hole 29 communicates the interior of the cylinder 10 with the interior of the hollow piston 20 so that upon activation of the actuator pressure compensation may take place between the two interior spaces of the cylinder 10 and, resp., of the hollow piston 20. In addition, through the vent hole 29 a dampening of the actuator may be adjusted, as will be described in the following. When the vent hole 29 is designed to be relatively small, low pressure compensation may take place, and, respectively, when the hollow piston 20 is moved out of the cylinder 10 so far that the vent hole 20 is moved beyond the proximal longitudinal end 21, and thus may vent into the ambience of the actuator, little venting takes place, in other words, when the vent hole 20 is designed to be relatively small, the actuator has little dampening and thus is designed to be so-to-speak "rigid". Inversely, when the vent hole 29 is designed to be relatively large, higher (faster) pressure compensation may take place and, respectively, when the hollow piston 20 is moved out of the cylinder 10 so far that the vent hole 29 is moved beyond the proximal longitudinal end 21 and thus may vent into the ambience of the actuator, more venting takes place; i.e. the actuator exhibits more dampening and thus is designed to be so-to-speak "soft".

Additionally, the vent hole 29 further allows perfect resetting of the actuator. What is meant here is that in the activated stale in which the vent hole 29 is moved beyond the proximal longitudinal end 21 such optimum venting into the ambience of the actuator may take place that, as needed, the hollow piston 20 can be slid into the cylinder 10 again without any major effort. Such resetting capability is desired in the case of a hood of a vehicle, for example, which is to be reset to its initial position again after having been functionally lifted by the actuator.

An igniter unit 30 is tightly connected to the hollow piston 20. The igniter unit 30 includes an igniter 31 which is formed by an igniter base 31a and an ignition chamber 31b. The igniter base 31a preferably takes the form of an injection-molded part. Preferably the igniter base 31a is made from plastic material. The igniter base 31a supports an ignition chamber 31b in which pyrotechnical igniter charge is accommodated. Furthermore, in the ignition chamber 31b ignition wires are provided which are electrically coupled to a pigtail 16. In this way the igniter 31 can be triggered by an electric current pulse.

The igniter base 31a may be provided with a retaining ring 35. The retaining ring 35 is preferably made from metal. The retaining ring 35 reinforces the connection between the igniter base 31a and the hollow piston 20.

The igniter 31, especially the igniter base 31a, is further tightly connected to a propellant cap 32. The propellant cap 32 confines a combustion chamber 33 in which the propellant pellets 34 are accommodated. Instead of the propellant pellets 34, also propellant rings and/or propellant granules may be provided. By burn-off the propellant pellets 34 release propellant gas which propagates via openings (not shown) in the front plate and/or on the radial side of the propellant cap 32 inside the hollow piston 20 and which is passed through the filter 28. As an alternative, the propellant cap 32 may have no such additional openings and the front plate of the propellant cap 32 and/or the side wall of the propellant cap 32 may burst open or tear and release the propellant gas in the direction of the filter 28. In the filter 28 propellant particles and, resp., propellant slag will deposit. The propellant gas continues flowing through the gas outlet openings 27 into the cylinder 10. The propellant gas impinges on the end cover 13. Due to the increase in pressure inside the cylinder 10, especially in the area of the end cover 13, a relative movement between the hollow piston 20 and the cylinder 10 is triggered.

The relative movement between the cylinder 10 and the hollow piston 20 may be differently configured. What is merely relevant is which of the two components, viz. the cylinder 10 or the hollow piston 20, is mounted to be stationary, for example in a vehicle. For example, the cylinder 10 may be mounted to be stationary. For this purpose, in FIG. 1 a body part 40 of a vehicle is sketched in the form of a retaining sheet. In this case, after activation of the actuator and thus after igniting the igniter unit 30 the hollow piston 20 is slid out of the cylinder 10 in a longitudinally axial direction through the proximal axial opening 12 of the cylinder 10. Said displacement is delimited by the limit stop being formed by the radial flange 23a of the piston closure element 23 and the interaction thereof with the tapering 14 of the cylinder 10.

When the hollow piston 20 is maintained or fixed to be stationary, the flow of the propellant gas out of the gas outlet opening 27 produces displacement of the cylinder 10. The cylinder 10 is moved in the distal direction.

In both cases the transition from the preceding idle state of the actuator to an activated state is initiated. In the activated state the cylinder 10 and the hollow piston 20 are displaced against each other so that the total length of the actuator is larger in the activated state than in the idle state. In other words, the hollow piston 20 is received in the cylinder 10 or, resp., inserted in the cylinder 10 in the idle state exemplified in FIGS. 1 and 2 so that the actuator in total has compact dimensions. This relates especially to the overall length which is reduced as compared to the state of the art.

Figure 2:
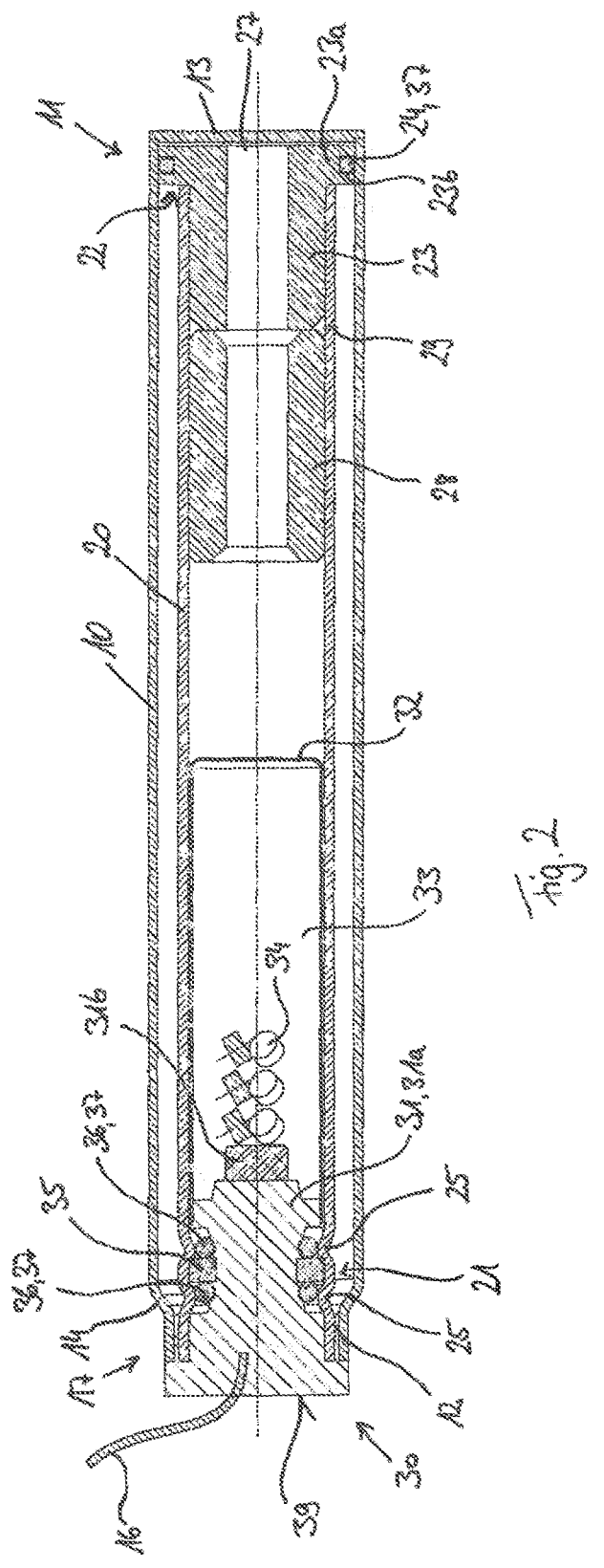

In the embodiments according to FIGS. 1 and 2, the connection of the igniter unit 30 to the hollow piston 20 is established substantially by crimping 25 of the hollow piston 20. In particular, at the proximal longitudinal end 21 of the hollow piston 20 a radially peripheral crimping is provided which establishes a positive connection between the igniter base 31a and the hollow piston 20. In the embodiment according to FIG. 1, additionally a lip 26 is formed at the proximal longitudinal end 21 of the hollow piston 20. The lip 26 is formed by forming the hollow piston end inwardly in the radial direction with the lip 26 engaging in an annular recess 38 of the igniter base 31a and in this way establishing an additional positive connection and, resp., fixation of the igniter unit 30 within the hollow piston 20.

In order to ensure optimum functioning of the actuator it is useful to provide a sealing of the cylinder 10 against the hollow piston 20. In the embodiment according to FIG. 1, said sealing is made by the seal ring 24 arranged in the inner annular groove 15 at the proximal end 17 of the cylinder 10. Furthermore, a base seal 36 is provided between the igniter unit 30, especially the igniter base 31a and the hollow piston 20. The base seal 36 is constituted, just like the seal ring 24, by an O-ring 37.

FIG. 2 illustrates a second embodiment of an actuator according to the invention. The embodiment according to FIG. 2 differs from the embodiment according to FIG. 1 especially by the arrangement of the seal ring 24 and the base seal 36 as well as by the shape of the igniter base 31a. As regards the sealing of the cylinder 10 against the hollow piston 20, the embodiment according to FIG. 2 provides to arrange on the piston closure element 23, especially on the radial flange 23a, an outer annular groove 23b in which the seal ring 24 is disposed. Hence sealing is not carried out at the proximal longitudinal end 21 of the hollow piston 20, as provided in FIG. 1, but at the distal longitudinal end 22.

In the embodiment according to FIG. 2 the base seal 36 is formed by two O-rings 37 which are arranged on opposite sides of the retaining ring 35. The igniter base 31a is fixed within the hollow piston 20 by two crimps 25 which are equally provided on both sides of the retaining ring 35. The two crimps 25 simultaneously act on the O-rings 37 of the base seal 36 and in this way ensure proper sealing.

In the embodiment according to FIG. 2, moreover the cylinder 10 is provided to have a uniform wall thickness. The tapering 14 is formed at the proximal end 17 of the cylinder 10 substantially by a shoulder which is produced in the proximal direction by diameter reduction of the cylinder 10. Furthermore, in FIG. 2 it is visible as regards the connection of the hollow piston 20 to the igniter base 31a that a proximal longitudinal end 21 of the hollow piston 20 is embedded in the igniter base 31a. In particular, it may be provided that the igniter base 31a is injection-molded directly to the proximal longitudinal end 21 of the hollow piston 20 by an injection-molding process so that the igniter base 31a is appropriately fixed to the proximal longitudinal end 21 of the hollow piston 20.

It applies to all embodiments that both the igniter base 31a and the end cover 13 may form an actuating element for functional elements of a vehicle safety system to be activated. In any case the igniter base 31a may be provided to form such actuating element, when the cylinder 10 is mounted to be stationary inside a vehicle and in so far the hollow piston 20 is slid out of the cylinder 10 in the activated state. When, on the other hand, the hollow piston 20 is fixed to be stationary, the end cover 13 of the cylinder 10 preferably constitutes such actuating element.

When the igniter base 31a forms the actuating element, it is useful to provide an end face 39 with a metallic surface. For example, a metal plate may be provided on the end face 39. In this way the stability of the actuating element is increased.

LIST OF REFERENCE NUMERALS 10 cylinder
11 distal end
12 proximal axial opening
13 end cover
14 tapering
15 inner annular groove
16 pigtail
17 proximal end
20 hollow piston
21 proximal longitudinal end
22 distal longitudinal end
23 piston closure end
23a radial flange
23b outer annular groove
24 seal ring
25 crimping
26 lip
27 gas outlet opening
28 filter
29 vent hole
30 igniter unit
31 igniter
31a igniter base
31b ignition chamber
32 propellant cap
33 combustion chamber
34 propellant pellet
35 retaining ring 36 base ring
37 O-ring
38 annular recess
39 end face
40 body part

The invention claimed is:

1. A pyrotechnical actuator for a vehicle safety system comprising a cylinder (10) and a hollow piston (20) which are displaceable relative to each other from an idle state to an activated state, wherein an igniter unit (30) being tightly connected to the hollow piston (20) is arranged inside the hollow piston (20), wherein the idle state the hollow piston (20) is received in the cylinder (10) and in the activated state it protrudes at least partially from the cylinder (10) so that the actuator has a larger total length in the activated state than in the idle state, an opening (29) extending radially through the hollow piston (20) for damping relative movement between the cylinder (10) and the hollow piston (20).

2. The actuator according to claim 1, wherein the hollow piston (20) is accommodated substantially completely in the cylinder (10) in the idle state and the igniter unit (30) is tightly connected to a proximal longitudinal end (21) of the hollow piston (20), wherein in the idle state of the actuator the igniter unit (30) is positioned inside a proximal axial opening (12) of the cylinder (10).

3. The actuator according to claim 2, wherein an igniter base of the igniter is positively connected to the proximal longitudinal end of the hollow piston.

4. The actuator according to claim 1, wherein the igniter unit (30) forms or includes an actuating element for functional elements of the vehicle safety system to be activated.

5. The actuator according to claim 1, wherein the hollow piston (20) has a length substantially corresponding to the length of the cylinder (10), wherein the hollow piston (20) has a distal longitudinal end (22) including a gas outlet opening (27), wherein the hollow piston (20) together with the igniter unit (30) forms a piston assembly which forms a unit by surrounded plastic injection-molding, wherein a filter (28) for propellant particles is arranged inside the hollow piston (20).

6. The actuator according to claim 1, wherein the cylinder (10) has a distal end cover (13) which completely closes the cylinder (10) in the idle state and in the activated state, wherein in the activated state of the actuator the distal end cover (13) of the cylinder (10) is further distant from the distal longitudinal end (22) of the hollow piston (20) than in the idle state of the actuator.

7. The actuator according to claim 1, wherein the hollow piston (20) includes a piston closure element (23) guiding the hollow piston (20) inside the cylinder (10) and/or in the activated state constituting a limit stop for the hollow piston (20).

8. The actuator according to claim 1, wherein the igniter unit (30) includes a propellant cap (32) which delimits a combustion chamber (33) for propellant, especially propellant pellets and/or propellant rings and/or propellant granules.

9. An actuator assembly, especially a hood lifting device for a vehicle, comprising an actuator according to claim 1, wherein the cylinder (10) is fixed to be stationary so that the hollow piston (20) is movable relative to the cylinder (10) during transition from the idle state to the activated state, or the hollow piston (20) is fixed to be stationary indirectly by the igniter base (31a), so that the cylinder (10) is movable relative to the hollow piston (20) during transition from the idle state to the activated state.

10. A vehicle safety system, especially an airbag system, comprising an actuator or an actuator assembly according to claim 1.

11. A method of operating an actuator according to claim 1, wherein upon triggering the igniter unit (30) inside the hollow piston (20) pressure is built up which acts against a distal end cover (13) of the cylinder (10) so that the hollow piston (20) and the cylinder (10) are moved relative to each other, wherein the igniter unit (30) moves away from the distal end cover (13) of the cylinder (10).

12. The actuator according to claim 1, wherein the opening is radially aligned with the cylinder in the idle state and is longitudinally spaced from the cylinder in the activated state.

13. A pyrotechnical actuator for a vehicle safety system comprising:
a cylinder;
a hollow piston slidably received in the cylinder and including a first end and a second end; and
an igniter unit secured to the first end and extending into the piston, the cylinder and the piston being displaceable relative to one another from an idle state to an activated state upon actuation of the igniter unit, the actuator having a first total length in the idle state and a second total length greater than the first total length in the activated state, the second end of the piston including a radial opening for damping relative movement between the cylinder and the piston.

14. The actuator according to claim 13, wherein the opening is radially aligned with the cylinder in the idle state and is longitudinally spaced from the cylinder in the activated state.

* * * * *